(12) United States Patent (10) Patent No.: US 12,686,025 B2
Kunz et al. (45) Date of Patent: Jul. 21, 2026

(54) PATH CORRECTION METHOD FOR A COATING SYSTEM

(71) Applicant: Dürr Systems AG, Bietigheim-Bissingen (DE)

(72) Inventors: Harald Kunz, Bruchsal (DE); Julian Ricardo Diaz Posada, Kornwestheim (DE); Björn Schöll, Asperg (DE); Alexander Spiller, Korntal-Münchingen (DE)

( * ) Notice: Subject to any disclaimer, the term of this patent is extended or adjusted under 35 U.S.C. 154(b) by 215 days.

(21) Appl. No.: 18/553,577

(22) PCT Filed: Apr. 4, 2022

(86) PCT No.: PCT/EP2022/058883
§ 371 (c)(1),
(2) Date: Oct. 2, 2023

(87) PCT Pub. No.: WO2022/214431
PCT Pub. Date: Oct. 13, 2022

(65) Prior Publication Data
US 2024/0181484 A1 Jun. 6, 2024

(30) Foreign Application Priority Data
Apr. 7, 2021 (DE) ...................... 10 2021 108 563.2

(51) Int. Cl.
B05B 13/04 (2006.01)
B25J 9/16 (2006.01)
(Continued)

(52) U.S. Cl.
CPC ......... B05B 13/0431 (2013.01); B25J 9/1684 (2013.01); B25J 11/0075 (2013.01); G05B 19/4155 (2013.01); *G05B 2219/40269* (2013.01)

(58) Field of Classification Search
CPC . B05B 13/0431; B25J 9/1684; B25J 11/0075; G05B 19/4155
See application file for complete search history.

(56) References Cited

U.S. PATENT DOCUMENTS 4,919,967 A 4/1990 Handke et al.
11,161,134 B2 * 11/2021 Medard ................. B05B 12/084
(Continued)

FOREIGN PATENT DOCUMENTS

CN 105045098 A 11/2015
CN 106183511 A 12/2016
(Continued)

OTHER PUBLICATIONS

International Search Report and Written Opinion for PCT/EP2022/058883 mailed Jul. 22, 2022 (14 pages; with English translation).
(Continued)

*Primary Examiner* — Nathan H Empie
(74) *Attorney, Agent, or Firm* — Taft Stettinius & Hollister LLP; Thomas E. Bejin; John W. Carpenter

(57) ABSTRACT

The disclosure relates to a path correction method for correcting paint tracks when coating a component (e.g., motor vehicle body component) with a coating agent (e.g., paint). The path correction method includes:
Defining a reference path,
applying a first paint track of the coating agent to the component, where the first paint track and the reference path run adjacent to one another and ideally adjoin one another without a path error at a seam,
determining the interfering path error at the seam between the first paint track and the adjacent reference path, and
determining path correction values for correcting the course of the first paint track in a subsequent coating operation, the path correction values being determined as a function of the path error.
(Continued)

Furthermore, the disclosure comprises a corresponding coating method and a correspondingly adapted coating system.

12 Claims, 9 Drawing Sheets

(51) Int. Cl.
B25J 11/00 (2006.01)
G05B 19/4155 (2006.01)

(56) References Cited

U.S. PATENT DOCUMENTS

| | | | |
|---|---|---|---|
| 11,203,030 B2 | 12/2021 | Fritz et al. | |
| 11,379,968 B2 | 7/2022 | Ojima et al. | |
| 2005/0100680 A1* | 5/2005 | Bustgens | B05B 12/12 427/427.1 |
| 2013/0257984 A1 | 10/2013 | Beier et al. | |
| 2015/0138275 A1 | 5/2015 | Noell | |
| 2016/0355026 A1 | 12/2016 | Mathis et al. | |
| 2017/0252765 A1 | 9/2017 | Medard et al. | |
| 2018/0201029 A1 | 7/2018 | Mathis | |
| 2018/0257101 A1 | 9/2018 | Miyazaki et al. | |
| 2020/0198367 A1* | 6/2020 | Zhang | B41J 3/4073 |

FOREIGN PATENT DOCUMENTS

| | | | |
|---|---|---|---|
| CN | 111013887 | A | 4/2020 |
| DE | 10 2012 006 370 | A1 | 10/2013 |
| DE | 11 2018 006287 | T5 | 10/2020 |
| DE | 10 2019 119 730 | A1 | 1/2021 |
| EP | 3098082 | B1 | 11/2016 |
| EP | 3213823 | A1 | 9/2017 |
| EP | 3532206 | B1 | 5/2020 |
| JP | 2016221958 | A | 12/2016 |
| JP | 2018143975 | A | 9/2018 |
| JP | 2020138132 | A | 9/2020 |
| JP | 2022064544 | A | 4/2022 |
| WO | 2014139938 | A1 | 9/2014 |

OTHER PUBLICATIONS

Japanese Patent Notification of Reasons for Rejection for related application No. 2023-561676 dated Nov. 11, 2025 (6 pages with English translation).

European Patent Office Action for related application No. 22 720 648.9-1201 dated Nov. 7, 2025 (6 pages).

Chinese Patent Office—Office Action and Search Report for related application No. 202280023013.3 dated Feb. 2, 2026 (12 pages; with English translation of Search Report).

* cited by examiner

PATH CORRECTION METHOD FOR A COATING SYSTEM

CROSS-REFERENCE TO RELATED APPLICATIONS

This application is a national stage of, and claims priority to, Patent Cooperation Treaty Application No. PCT/EP2022/ 058883, filed on Apr. 4, 2022, which application claims priority to German Application No. DE 10 2021 108 563.2, filed on Apr. 7, 2021, which applications are hereby incorporated herein by reference in their entireties.

FIELD

The disclosure relates to a path correction method for correcting paint tracks during the coating of a component (e.g. motor vehicle body component) with a coating agent (e.g. paint). Furthermore, the disclosure relates to a corresponding coating method and a coating plant for carrying out the methods.

BACKGROUND

In modern painting plants for painting motor vehicle body components, rotary atomizers are usually used as application devices, which emit a spray jet of a paint and are guided by multi-axis painting robots over the motor vehicle body components to be painted. The rotary atomizers are usually guided along predefined paint tracks that run parallel to one another and are programmed in such a way that the overlapping of the coatings applied in the adjacent paint tracks results in a coating thickness that is as constant as possible. When rotary atomizers are used as application device, the path accuracy of the painting robots used is sufficient to achieve an acceptable painting result, since rotary atomizers do not produce sharply defined paint tracks on the component surface.

In a more recent line of development, however, the application device used is not rotary atomizers but so-called print heads, which offer the advantage that virtually no disturbing overspray is produced, since the application efficiency of print heads is close to 100%. However, these print heads do not generate a spatially extended and not sharply defined spray jet, but apply paint tracks with a comparatively sharp boundary. As a result, the print head should be positioned very precisely when applying adjacent paint tracks so that there are no gaps or overlaps between the adjacent paint tracks. The required path accuracy can still be achieved with known painting robots if the adjacent paint tracks are applied by the same painting robot, in the same direction, at the same speed and with the same orientation. In practice, however, it is not always possible to meet these requirements, since the adjacent paint tracks are usually applied in opposite directions. In addition, it may be desirable to apply the adjacent paint tracks from different painting robots. In these cases, the problem may arise that the path accuracy when applying the adjacent paint tracks is not sufficient, so that gaps or interfering overlaps occur at the seams between the adjacent paint tracks. The gaps between the adjacent paint tracks then result in an interruption of the otherwise continuous coating, while the overlaps between the adjacent paint tracks lead to an over-coating with an excessively high film thickness.

The problem of insufficient path accuracy described above when using print heads as an application device is exacerbated even further if a continuous pattern is to be applied rather than a monochrome coating layer. The adjacent paint tracks must then fit exactly to each other, because otherwise the pattern in the adjacent paint tracks is offset relative to each other, so that even small positioning errors are visually disturbing.

With regard to the technical background of the disclosure, reference should also be made to EP 3 098 082 B1 (US2016/ 0355026), DE 10 2012 006 370 A1 (US2013/0257984), DE 10 2019 119 730 A1 and US 2015/0 138 275 A1.

DETAILED DESCRIPTION

Figures 1, 2:
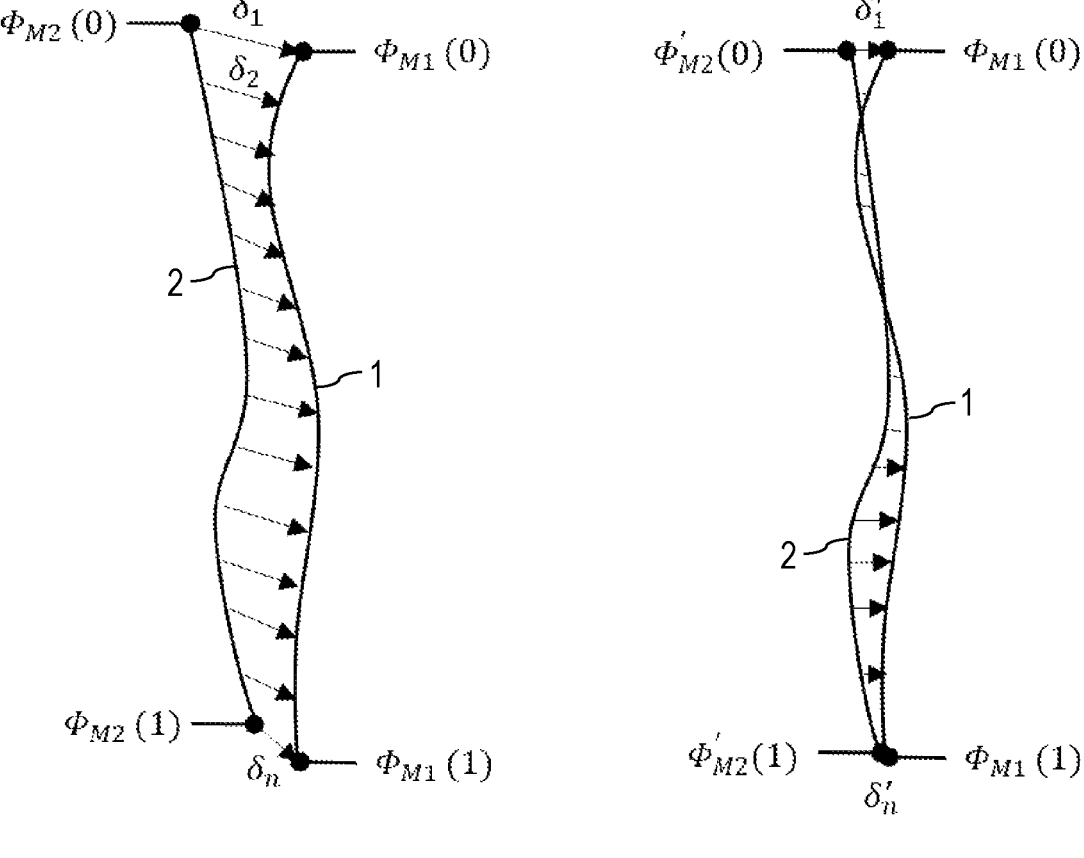
FIG. 1 shows a schematic representation of two uncorrected paint tracks.
FIG. 2 shows a representation corresponding to FIG. 1 with corrected paint tracks.

The path correction method according to the disclosure enables the correction of paint tracks applied during the coating of a component with a coating agent. In an embodiment of the disclosure, the path correction method is used to correct paint tracks that are applied during the coating of a motor vehicle body component with a paint. However, the disclosure is not limited to automotive body components with respect to the components to be coated, but is also applicable to other types of components. Furthermore, the disclosure is also not limited to paints with respect to the coating agent applied, but can in principle also be implemented with other types of coating agents. Furthermore, the disclosure is also not limited to a particular type of the respective application device. However, the disclosure is particularly advantageous when using so-called print heads as application devices. Such print heads differ from rotary atomizers or other atomizers in that no spatially extended spray jet of the paint is emitted, but rather a spatially narrowly limited coating agent jet, whereby the application efficiency is close to 100%, so that almost no overspray occurs.

In the path correction method according to the disclosure, a reference path is first defined, which then serves as the reference path for the path correction method.

In one variant of the disclosure, the reference path is a component edge, such as a roof edge of a motor vehicle body or an edge of a fender, a door, an engine hood or a trunk lid, to name just a few examples. However, in this variant of the disclosure, the reference path does not necessarily have to run along the edge of the component to be coated. It is also possible for the reference path to run within the component surface, as is the case, for example, with so-called design edges (character edges). However, the reference path (e.g. component edge, design edge) should be easily detectable by an optical measurement system, as will be described in detail.

In addition, the path correction method according to the disclosure provides that a first paint track of the coating agent is applied to the component, with the first paint track and the reference path running next to each other and, ideally, adjoining each other at a seam without a path error. The first paint track is thus applied with uncorrected path data, which is only to be corrected as part of the path correction method according to the disclosure.

Subsequently, the interfering path error at the seam between the first paint track on the one hand and the adjacent reference path on the other hand is determined, which can be done, for example, by the optical measurement system already briefly mentioned above, as will be described in detail. For example, the width of the seam (gap or overlap) between the first paint track and the adjacent reference path can be measured.

In the next step, path correction values are then determined, which are used to correct the course of the first paint track in a subsequent coating operation, the path correction values being calculated as a function of the previously determined path error. If, for example, a gap is determined between the reference path and the first paint track, the first paint track can be moved closer to the reference path. If, on the other hand, no gap is determined between the reference path and the first paint track and instead a disturbing overlap occurs between the reference path and the first paint track, the first paint track can be moved away from the reference path by the path correction values.

It should be mentioned here that the path correction values are preferably calculated for a plurality of path points along the respective paint track. This means that the path correction can be performed individually for each path point along the paint track.

A first disclosure variant has been described above, in which the path errors are determined between the first paint track and a component edge or a design edge. In another variant of the disclosure, however, the reference path is formed by a second paint track which is applied to the component next to the first paint track. In this variant of the disclosure, at least two paint tracks are applied to the component next to each other, and the interfering path errors are then determined at the seam between the adjacent paint tracks. The path errors determined in this way are then used to calculate path correction values. If, for example, the adjacent paint tracks have an interfering overlap, the paint tracks can be moved away from each other at the respective point. If, on the other hand, there is a gap in the coating at the seam between the adjacent paint tracks, the adjacent paint tracks can be moved closer together at the respective point.

When applying and then measuring two adjacent paint tracks, the problem can arise that the seam is difficult to see, so that it is also difficult to determine the path errors. For example, the seam between adjacent paint tracks is difficult to detect when the adjacent paint tracks overlap, since the seam then only results in an over-coating that is more difficult to detect than a gap in the otherwise continuous coating. In one variant of the disclosure, it is therefore envisaged to make it easier to detect the seam between the adjacent paint tracks, so that the path errors can be determined better and more accurately. For this purpose, an artificial path gap can be created during the application of the first paint track and the second paint track, which is then expressed in a gap between the adjacent paint tracks, so that any path errors can be easily measured.

When using a printhead as an applicator, the aforementioned artificial path gap can be easily achieved by turning off individual nozzles of the applicator when applying the adjacent paint tracks. If, for example, the printhead has a nozzle row with several nozzles and the nozzle row is aligned transversely to the paint track when the paint tracks are applied, switching off an outer nozzle of the nozzle row results in a corresponding gap between the adjacent paint tracks, and this gap can then be easily detected by an optical measurement system.

Another way of generating the artificial path gap between the adjacent paint tracks is to rotate the applicator (e.g. print head) about its spray axis so that the applicator generates the first paint track and/or the second paint track with a narrower or wider track width according to its angle of rotation.

Other possibilities for creating the artificial path gap between the adjacent paint tracks consist of rotating or shifting the paint tracks relative to each other, whereby this can again be done individually for each path point. Shifting the coating track is currently the preferred variant.

When measuring two adjacent paint tracks, there are various possibilities within the scope of the path correction method according to the disclosure, which are briefly described below.

In one variant of the disclosure, the first paint track is first applied, measured and then removed. Then the second paint track is applied, measured and removed again. The path errors are then calculated from the path measurement values determined during the measurement of the two paint tracks. In this case, the paint tracks are thus measured independently and separately from one another.

In another variant of the disclosure, on the other hand, the two paint tracks are applied and then measured to determine the path error while both paint tracks are applied next to each other. In this case, the two paint tracks are measured together.

In one variant of the disclosure, the two paint tracks are thus each measured individually, while in another variant of the disclosure the two paint tracks are measured together.

Above, only the determination of path errors and corresponding path correction values for exactly two adjacent paint tracks was described. In practice, however, not only two paint tracks are applied, but a much larger number of parallel paint tracks. When correcting two paint tracks, a path error can therefore also affect paint tracks further away. Within the scope of the path correction method according to the disclosure, it is therefore preferably provided that path correction values for more distant paint tracks are also calculated.

It has already been briefly mentioned above that the path error can be determined by an optical measurement system. For example, this measurement system can be stationary and have a stationary camera that captures an image of the coated component surface. Alternatively, however, it is also possible to use a mobile measurement system that is attached to the former coating robot and can, for example, have a camera that determines the path error during coating. In both cases (stationary or mobile), the optical measurement system can have a light-section measurement system comprising at least one light source and one camera. The light source projects a light line onto the component, which is then captured by the camera. For example, a light emitting diode (LED) or a laser can be used as the light source.

It has already been mentioned above that the adjacent paint tracks can be applied by two separate coating robots. In this case, it is possible for a mobile measurement system to be attached to each of the two coating robots.

Alternatively, however, it is also possible for two coating robots to apply the adjacent paint tracks, but with a mobile measurement system attached to only one of the two coating robots.

The path correction method according to the disclosure has been described above, which is used to determine path correction values that can then be used in the actual coating operation to correct the path of the paint tracks The coating method additionally provides that a coating operation is carried out, wherein in the coating operation paint tracks lying next to one another are applied to the component to be coated, which tracks form a predetermined coating on the component, in particular a continuous coating agent film or a predetermined pattern, wherein the path correction values determined in the path correction method are taken into account in order to correct the course of the paint tracks accordingly.

In the coating operation, a coating program usually runs that controls the coating operation. For example, the coating program controls the coating robot and the application device, whereby the coating program runs on a control computer during coating.

In one variant of the disclosure, the coating program is corrected offline using the previously determined path correction values, i.e. not on the control computer that controls the coating operation.

In another variant of the disclosure, however, the coating program is corrected online with the path correction values, i.e. on the control computer on which the control program also runs.

It has already been briefly mentioned above that the disclosure is not limited to paints with regard to the coating agent used. For example, the applied coating agent can also be an insulating material for acoustic and/or thermal insulation or an adhesive, to name just a few examples.

It has already been explained at the outset in the description of the problem underlying the disclosure that the application of patterns is more problematic than the production of a continuous monochrome coating. This is due to the fact that even small positioning errors are visually disturbing when applying patterns. In the path correction method according to the disclosure, it is therefore also possible to apply a pattern which is then optically measured. Depending on the measured values determined in this way, path correction values are then determined for applying the pattern.

The path correction method according to the disclosure and the associated coating method have been described above. However, the disclosure also claims protection for a coating system adapted to carry out these methods. Thus, the coating system according to the disclosure first comprises a first application device for applying the coating agent to the component, the first application device being guided by a first coating robot. In addition, the coating system according to the disclosure comprises a control device for controlling the first application device and the first coating robot by means of a control program which is executed in the control device during operation. The control program is now designed to execute the path correction method or the coating method according to the disclosure.

Here, the coating system can also have a second application device and a second coating robot, which are also controlled by the control device. This is the case, for example, if the adjacent paint tracks are applied by different coating robots, as already briefly mentioned above as a possibility.

Furthermore, the coating system according to the disclosure can have a stationary or mobile measurement system, as has also been described above.

The schematic illustrations in FIGS. 1 and 2, each showing two adjacent paint tracks 1, 2, are described below. FIG. 1 shows the course of the two paint tracks 1, 2 before path correction, while FIG. 2 shows the course of the two paint tracks 1, 2 after path correction.

For further explanation of the disclosure, it is assumed that this is a closed applied surface. The application of the entire surface consists of individual strips of a certain width which, when placed end to end, are to form a closed, homogeneous application layer. One part of this surface is applied differently from the other. The difference in the application can have different causes, e.g. the two surfaces are applied by different robots or a robot moves in different directions or with different speed, orientation, paint quantity, different applicator . . . etc. during the coating of the paint tracks 1, 2 (partial surfaces).

The fact is that an error occurs between the two applied paint tracks 1, 2 (partial surfaces) at the seam, and it is necessary to eliminate this error. The described error at the seam is typically in the range of 0.05 mm to 5 mm. The target accuracy is in the range of 0.1 mm and better.

The following dependencies apply here:

$$\Phi_{M1}=[\sigma(1\_1),\sigma(1\_2),\ldots,\sigma(1\_j)]$$

where j is the number of programmed robot poses for the first paint track 1, and $$\Phi_{M2}=[\sigma(2\_1),\sigma\_(2\_2),\ldots,\sigma(2\_k)],$$

similar as for the first paint track 1, for the second paint track 2.

The paint tracks 1, 2 ($\Phi_{M1}$ and $\Phi_{M2}$) are normalized for the later calculations, as follows:

$$\Phi_{M1}:[01]$$

wherein $\Phi_{M1}(0)=\sigma(1\_1),\Phi_{M1}(1)=\sigma(1\_j),$ and $$\Phi_{M2}:[0\ 1]$$

wherein $\Phi_{M2}(0)=\sigma(2\_1),\Phi_{M2}(1)=\sigma(2\_k)$

In order to visualize the sum of defects at the seam, the area is first applied. In order to be able to record the defect quantitatively afterwards, the seam is measured with a measurement system. The resolution of the measurement system must be selected according to the application accuracy to be achieved. Two possibilities for generating the difference between the two adjacent seam paths were considered. The condition is that the measurement always takes place with the same measurement system in order to determine the relative deviation:

Either the application takes place by introducing a deliberate small gap between the paint tracks 1, 2, which is subsequently measured. This gap can be introduced, for example, by twisting or shifting the tracks, but also by selective control of the applicator (switching off individual nozzles, if possible). An applicator is a tool by means of which a specific coating is applied to a substrate. The applicator is mounted on the robot and is guided by it along the surface.

Alternatively, the two paint tracks 1, 2 are applied and measured separately. The first paint track 1 is applied and measured. The first paint track 1 is then removed and the second paint track 2 applied, which is then also measured.

For each programmed robot pose in the measuring program, the relative deviation between paint tracks 1, 2 is measured and defined as follows:

$$\Delta=[\delta 1, \delta 2, \ldots, \delta n]$$

with n as the number of programmed measurement poses and also normalized as follows: $\Delta:[0 \ 1]$, wherein $$\Delta(0)=\delta 1 \ und \Delta(1)=\delta n,$$

It should be noted that the deviation $\Delta$ can also be calculated by measuring each of the paint tracks 1, 2 in a common coordinate system (e.g. with an external measurement system). In this way, the deviation s$\Delta$ can also be defined as follows:

$$\Delta=[(\sigma_{M2\_1}-\sigma_{M1\_1}),(\sigma_{M2\_2}-\sigma_{M1\_2}), \ldots, \\ (\sigma_{M2\_n}-\sigma_{M2\_n})]$$

wherein $\Phi_{Mi}=[\sigma_{Mi\_1}, \sigma_{Mi\_2}, \ldots, \sigma_{Mi\_n})]$ represents the measured paint tracks with i as the number of paint tracks. The measurement takes place along the seam in a grid of any density; the denser, the more precise the subsequent compensation. The result is individual distances along the entire seam, the number of which corresponds to the selected grid density.

The compensation of all different error sources is one advantage of this approach. The deviation $\Delta$ between the paint tracks 1, 2 is the sum of the following error sources:

$$\Delta=E_P+E_{Proc}+E_{Robot}$$

with $E_P$ als component error, $E_{proc}$ process error und $E_{Robot}$ robot errors.

From the known nominal distances between the adjacent paint tracks 1, 2 and the measured actual distances, the difference can now be formed, which corresponds to the local error or, with reversed sign, to the correction value.

The path correction can be applied in different ways.

The robot program itself can be adapted by applying the corrections directly to the robot poses, e.g. by moving or rotating the applicator in the individual robot poses or by controlling the applicator differently. The correction can take place both offline via a separate program and online on the robot controller. How fine the correction can be depends on the density of the robot poses and the measured values.

However, it is also possible to store the path correction values in a value table and then compensate the robot motion with path correction values from this value table, depending on where the robot is located in the program or in the workspace.

To calculate the compensation, a homogeneous transformation ($T_L$) can optionally be fitted. Using this compensation transformation to compensate the measured path (here $\Phi_{M2}$), results in it being better positioned in space to the reference path (here $\Phi_{M1}$) as follows:

$$\text{Optimizing, so that, } \sigma_{M2\_n}\cdot T_L=\sigma_{M1\_n} \\ \text{for all } n \text{ measured elements in } \Phi_{M2}$$

In conclusion, the difference between $\Phi'_{M2}=\sigma_{M2}\cdot T_L$ and $\Phi_{M1}$ can be calculated with the homogeneous transformation (T) for each programmed pose in $\Phi_{M2}$ as follows: $(T\Phi_{M1})^{-1}\cdot T\Phi'_{M2}=\Delta'$. When $T_L=\varnothing$, $\Delta=\Delta'$, the difference in $\Phi_2$ in each programmed pose is compensated with respect to normalization. The dimension of the adaptation can be reduced depending on the application (e.g., only the positions or only two dimensions, if necessary).

If the coating program consists of several paint tracks, it is possible to follow the neighboring paint tracks to the seam path in the correction, so that the error does not move on by one paint track, but these are taken into account in the adaptation. The transfer of the correction to neighboring tracks can either take place homogeneously, i.e. all neighboring tracks are provided with the similar correction, or the correction is gradually reduced up to the edge of the coating. Changes in the alignment, position or shape of the application area can also be taken into account when applying the correction along the seam propagation.

The correction method can further be applied when there are multiple seams on a component.

It can happen that the measured corrections at the seam cannot be transferred to neighboring tracks because, for example, the position/driving method of the robot or the application surface itself deviates too much. In this case, not only the seam path between the partial surfaces is measured, but all distances between all directly adjacent tracks. As described above, these distances can be generated in different ways. Only the measuring program must be extended from one to n seams.

During the correction, the locally measured value is now taken into account. As a result, each robot pose is corrected in the full version in such a way that all distances between directly adjacent tracks become equal.

The measuring program can be used at the same time for the test measurement to check the correction. Finally, however, the corrections are made in such a way that the application overlaps with the desired dimensions, so that a homogeneous surface/appearance is obtained.

Preferably, the measurement is carried out with a camera or sensor system permanently mounted on the robot. However, it would also be possible to attach the measurement system to the robot only for adjustment and to keep it as a measuring device, so to speak, or to use an autonomous, robot-independent measurement system. A separate robot program, the measuring program, can be created for seam measurement. This means that the adjustment process can be repeated at any time as soon as changes are made to the application, component or robot, or if one of the components changes (e.g. due to temperature influences). Likewise, the measuring program would be a template when new components or samples need to be retrofitted.

Figure 10:
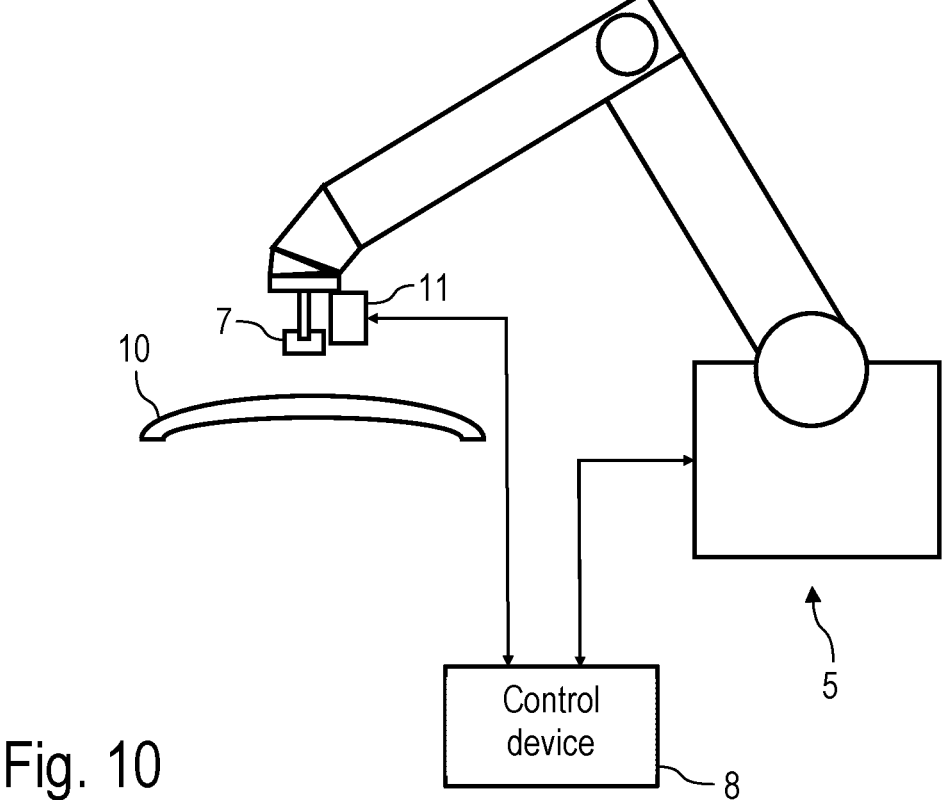
FIG. 10 shows a schematic representation of a coating system according to the disclosure with a mobile optical measurement system.

For this purpose, the sensor or camera takes images of the seam between the application paths and measures them with the aid of image processing tools (FIG. 10). The fact that the position of the measuring point and the corrected path point coincide is already taken into account when the measuring program is created. The measuring points are located at the same height as the path points. If necessary, however, measurement results can be interpolated/extrapolated.

Figure 3:
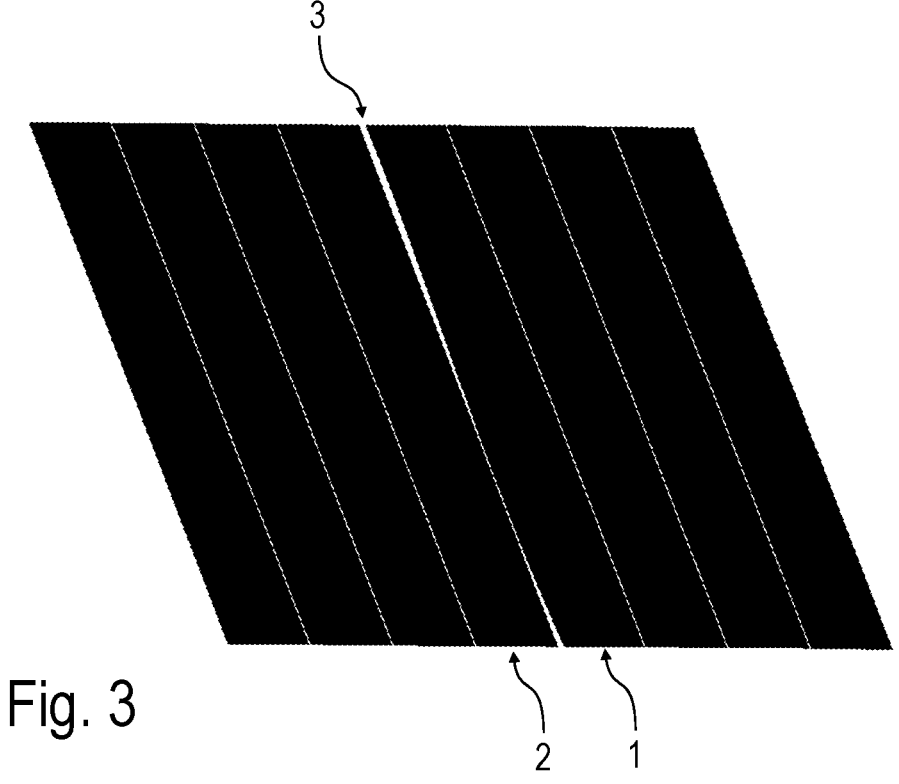
FIG. 3 shows two adjacent partial areas with a seam between the partial areas before path correction.
Figure 4:
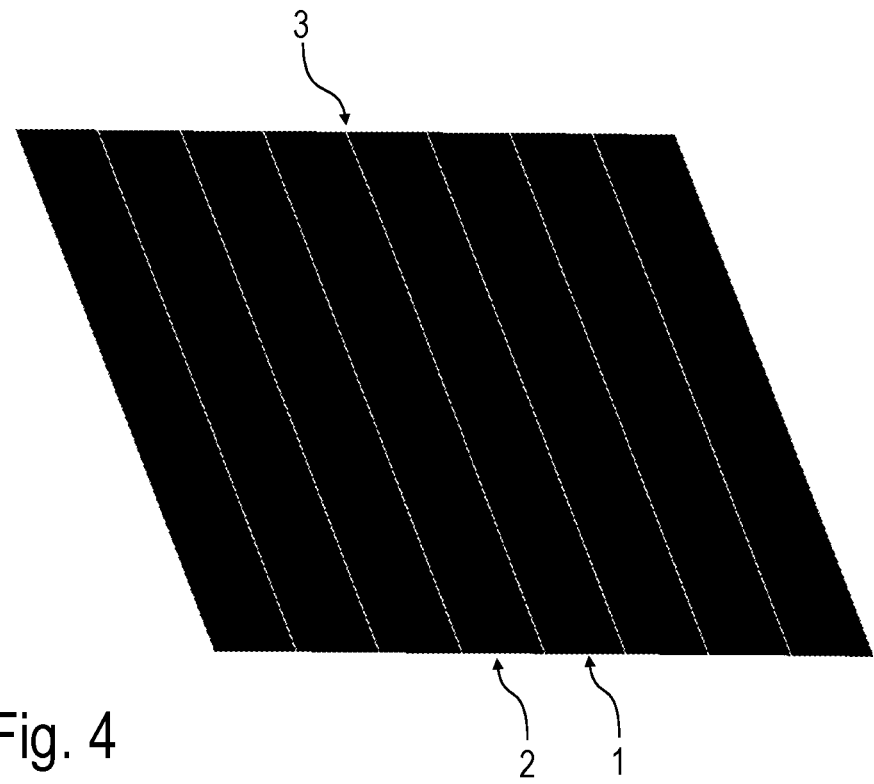
FIG. 4 shows the representation according to FIG. 3 after correction.

In the following, the schematic representation according to FIGS. 3 and 4 is now described, whereby the same reference signs are used for corresponding details, so that reference is made to the above description in order to avoid repetitions.

FIG. 3 shows the course of the paint tracks 1, 2 before path correction, while FIG. 4 shows the course of the paint tracks 1, 2 after path correction.

FIG. 3 shows that there is a gap between the two adjacent paint tracks 1, 2 at a seam 3, but the width of this gap is not constant along the paint tracks 1, 2. In the path correction method according to the disclosure, the gap between the adjacent paint tracks 1, 2 is optically measured at the seam 3, namely at a plurality of measuring points along the paint tracks 1, 2, as will be described in detail. The path of the paint tracks 1, 2 is then corrected according to the path error determined in this way, so that when the corrected paint tracks 1, 2 are applied, no gap is then visible at the seam 3, as can be seen in FIG. 4.

Figures 5A, 5B, 5C:
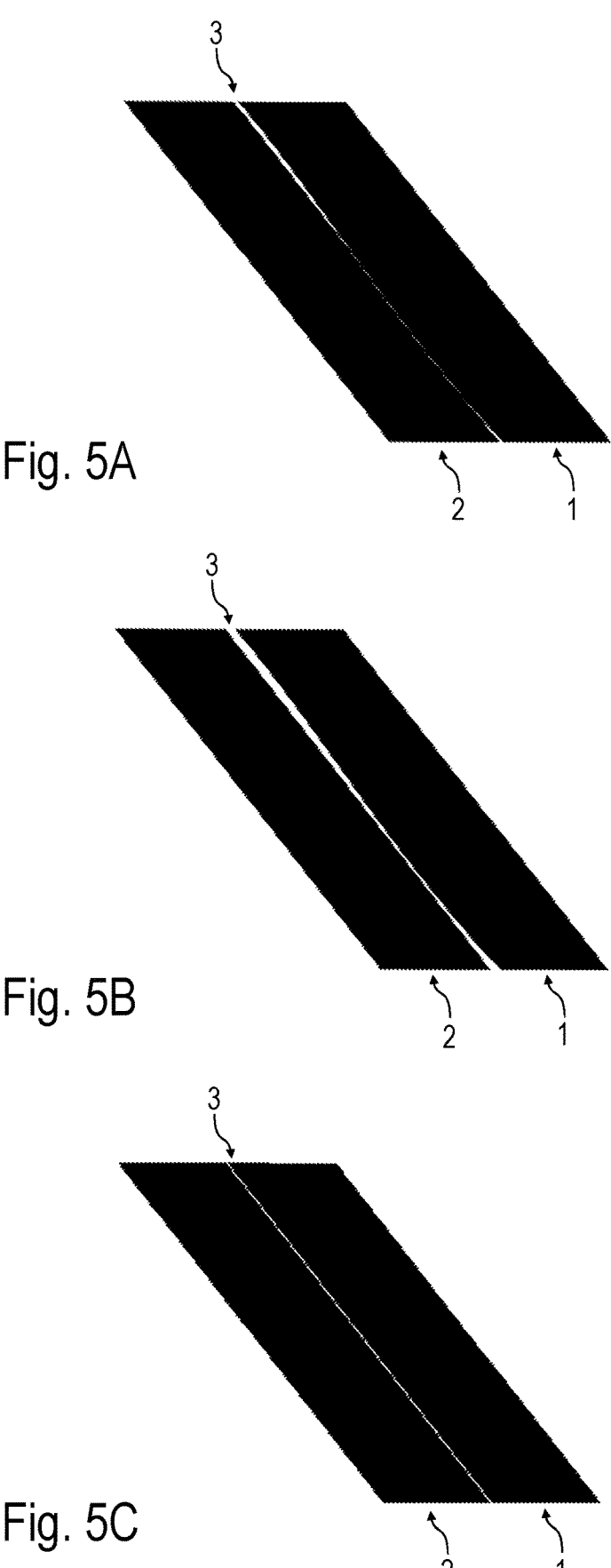
FIG. 5A shows two adjacent paint tracks with a seam between the paint tracks.
FIG. 5B shows the representation according to FIG. 5A with an additional gap at the seam to facilitate the measurement of the path error.
FIG. 5C shows a representation according to FIGS. 5A and 5B with a corrected path of the paint tracks.

FIGS. 5A-5C speak in part to the above-described FIGS. 3 and 4, so that to avoid repetition reference is made to the above description, the same reference signs being used for corresponding details.

FIG. 5A shows the course of the uncorrected paint tracks 1, 2, whereby a path error can be seen at the seam 3, which manifests itself partly in a gap and partly in an over-coating.

This makes optical measurement of the path error at seam 3 difficult. In this embodiment example, it is therefore provided that the seam 3 is artificially widened. For this purpose, individual nozzles are switched off in the nozzle head used as the application device, so that a pronounced gap is then created at the seam 3, which can be measured more easily optically, as shown in FIG. 5B.

Depending on the path error measured in this way, path correction values are then determined which are used to correct the paint tracks 1, 2 and, after correction, result in no more path error being detectable at the seam 3, as can be seen in FIG. 5C.

Figure 6:
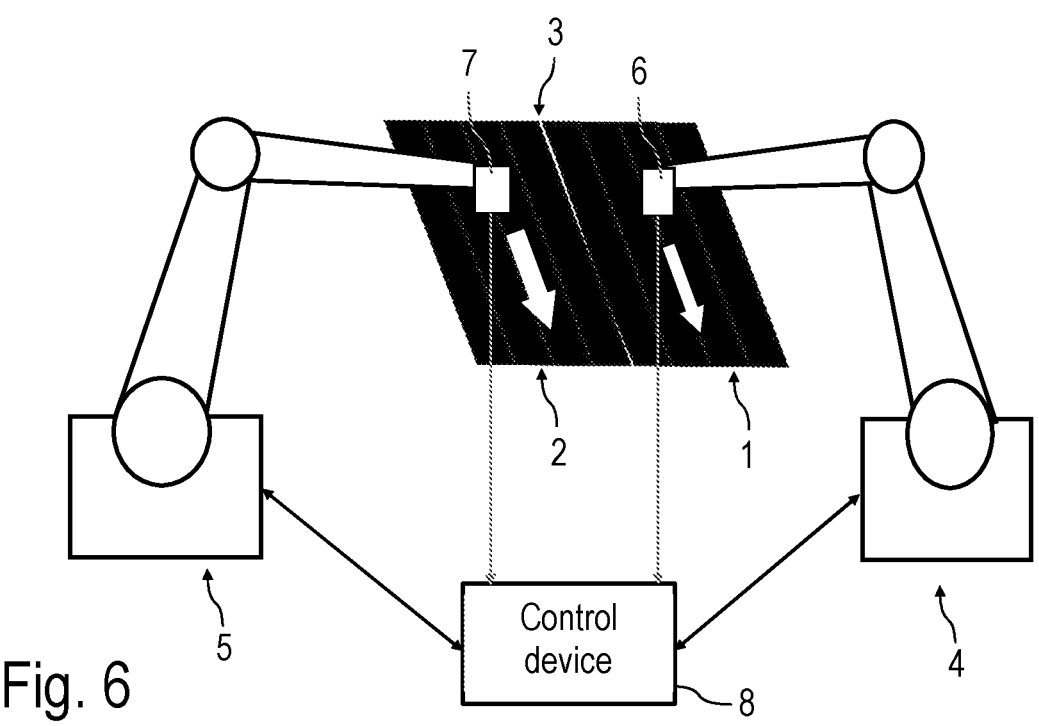
FIG. 6 shows a schematic representation of a coating system according to the disclosure with two coating robots.

FIG. 6 shows a schematic representation of a painting system according to the disclosure with two painting robots 4, 5, each of which guides an application device 6 and 7, respectively, each of which are print heads that do not emit a spray jet of the paint but a spatially narrowly limited paint jet.

In addition, the painting system shown has a control device 8 which controls the two painting robots 4, 5 and the two application devices 6, 7. A control program runs in the control device 8, which executes the path correction method or coating method described above. With regard to the details of the method, reference is made to the above description in order to avoid repetition.

Figure 7:
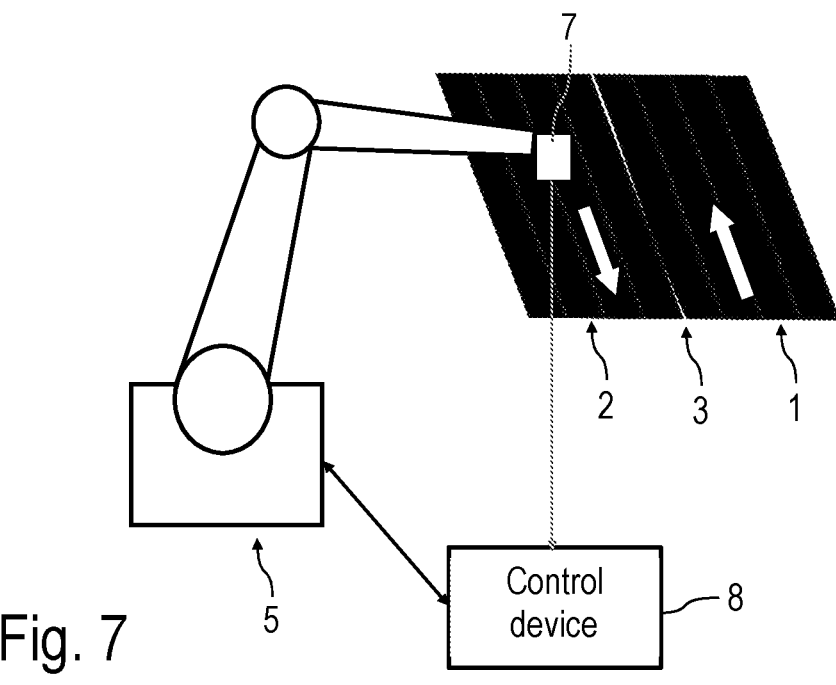
FIG. 7 shows a schematic representation of a coating system according to the disclosure with only one painting robot.

FIG. 7 shows a variation of FIG. 6, so that reference is made to the above description of FIG. 6 in order to avoid repetition.

One feature here is that the two paint tracks 1, 2 are applied by the same coating robot 5.

FIG. 8 again shows a representation of two adjacent paint tracks 1, 2 with a seam 3 between the two paint tracks 1, 2. In addition, the drawing here shows numerous measuring points 9 for measuring the path error at numerous path points along the paint tracks 1, 2.

Figure 8:
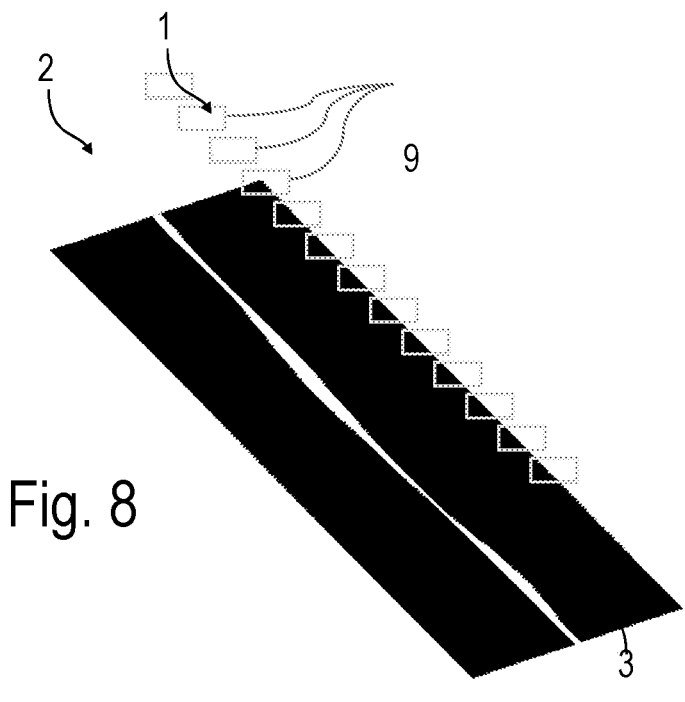
FIG. 8 shows a schematic representation of two adjacent paint tracks with numerous measuring points for measuring the path error.
Figure 9:
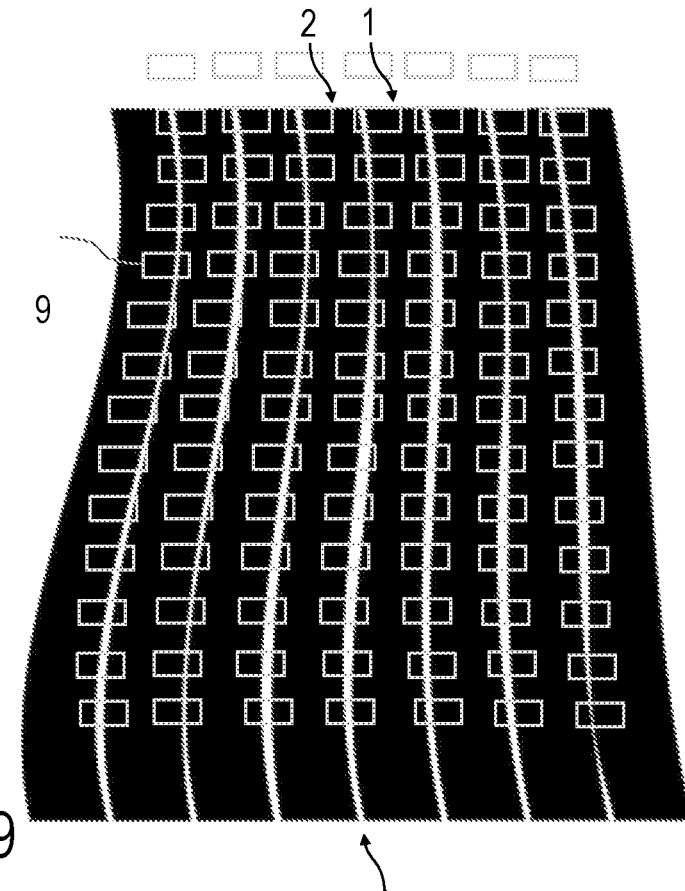
FIG. 9 shows a representation similar to FIG. 8 with numerous adjacent paint tracks.

FIG. 9 shows a modification to FIG. 8, so that to avoid repetition, reference is again made to the above description of FIG. 8. Here, in addition to the two paint tracks 1, 2, numerous other paint tracks with a correspondingly large number of measuring points are shown.

FIG. 10 again shows a schematic representation of a coating system according to the disclosure, which partly corresponds to the representations according to FIGS. 6 and 7, so that in order to avoid repetitions, reference is again made to the above description, whereby the same reference signs are used for corresponding details.

One feature here is that a component 10 to be coated is also shown.

Furthermore, an optical sensor 11 is shown which is guided by the painting robot 5 over the component 10, the sensor 11 being mounted next to the application device 7. For example, the optical sensor 11 may be a camera.

Figure 11:
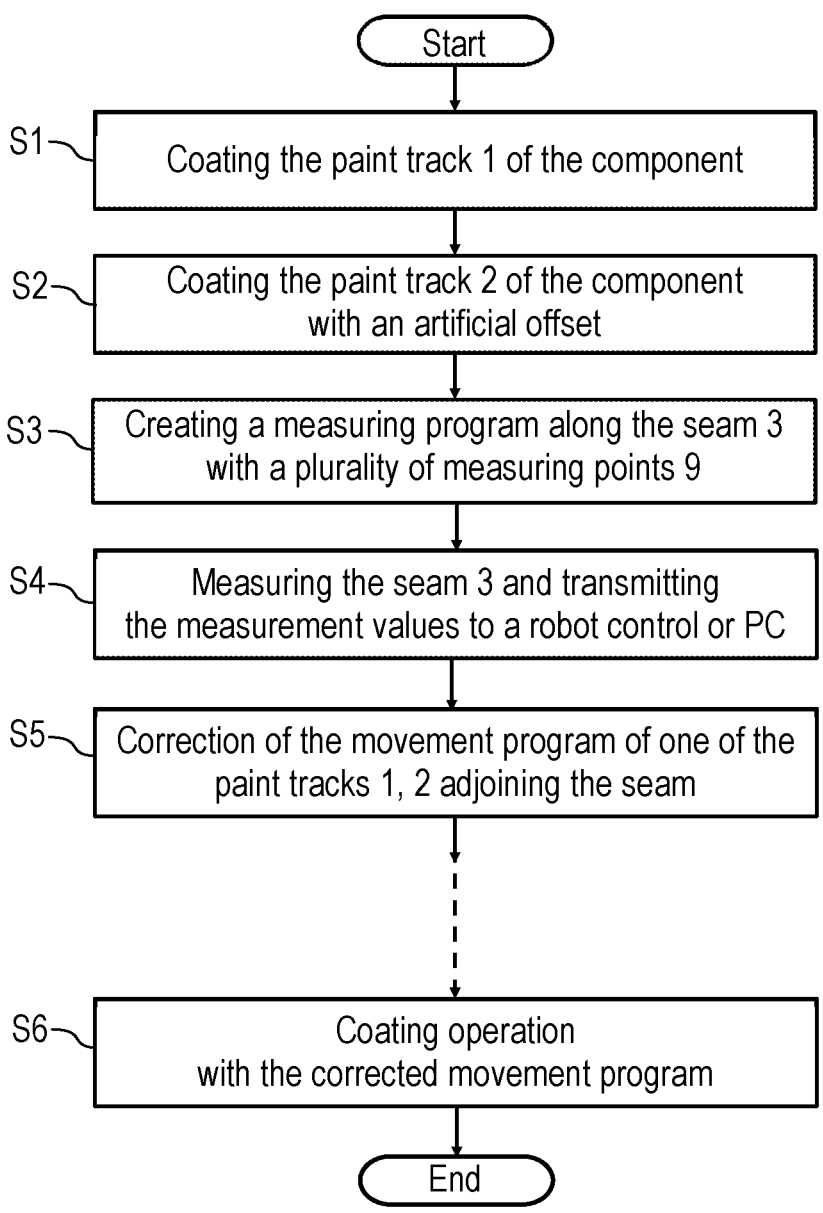
FIG. 11 shows a flow chart illustrating one variant of the path correction method according to the disclosure.

In the following, the flow diagram according to FIG. 11 is now described, which serves to illustrate the coating method according to the disclosure, including the path correction method.

In a first step S1, the paint track 1 (partial area) is first applied.

Then, in a step S2, the paint track 2 (partial area) is applied, whereby an artificial offset is generated. For this purpose, for example, a nozzle of a print head can be switched off.

In a step S3, a measuring program is created, whereby the path error is measured along the seam between the adjacent paint tracks 1, 2 at a plurality of measuring points 9.

In a step S4, the path errors are measured and corresponding measured values are transmitted to a robot controller or to a PC.

In a step S5, correction values for the motion program are calculated.

In a step S6, the actual coating operation is carried out with the motion program thus corrected.

Figure 12:
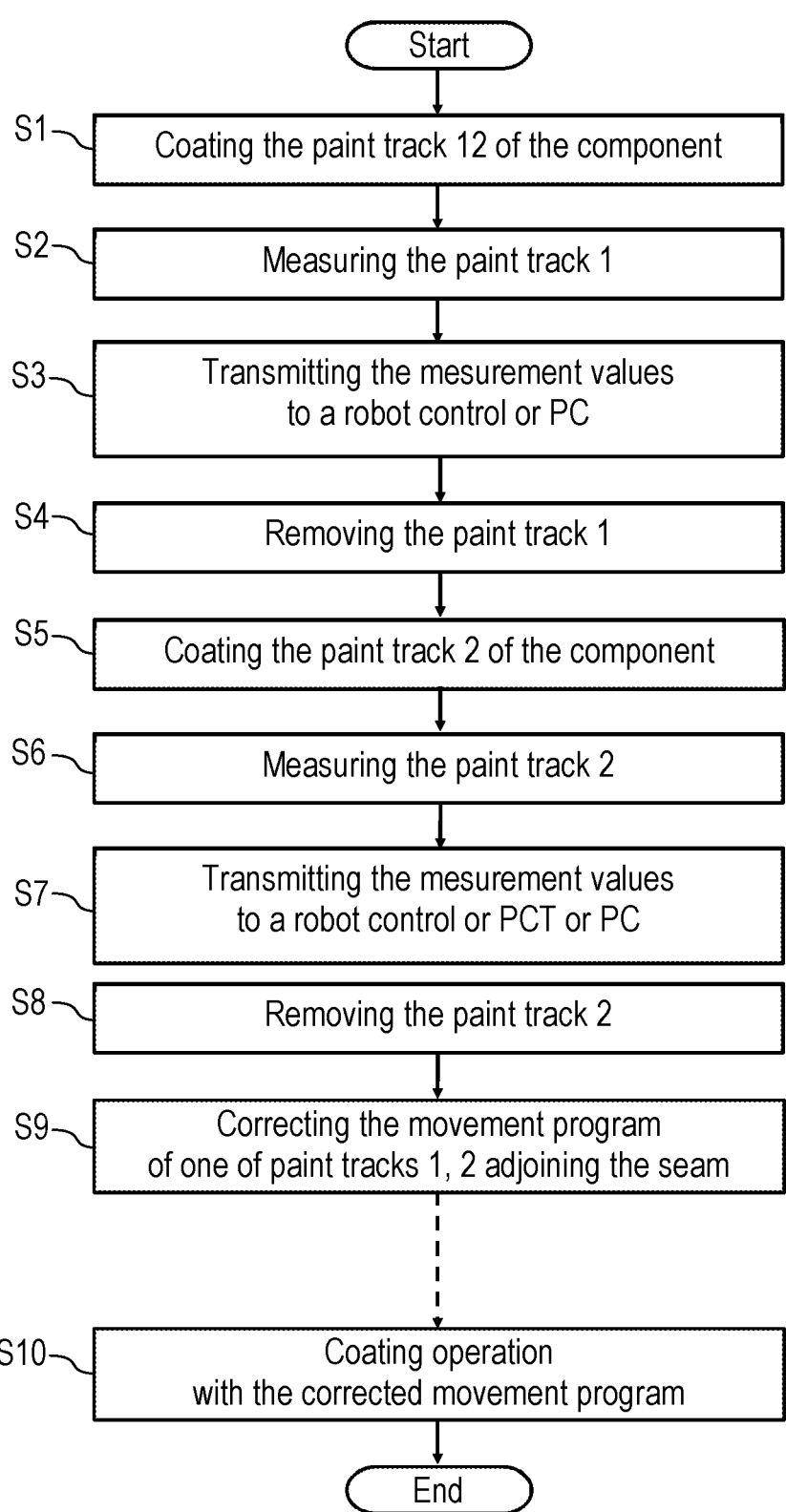
FIG. 12 shows a flow chart illustrating another variant of the path correction method according to the disclosure.
Figure 13:
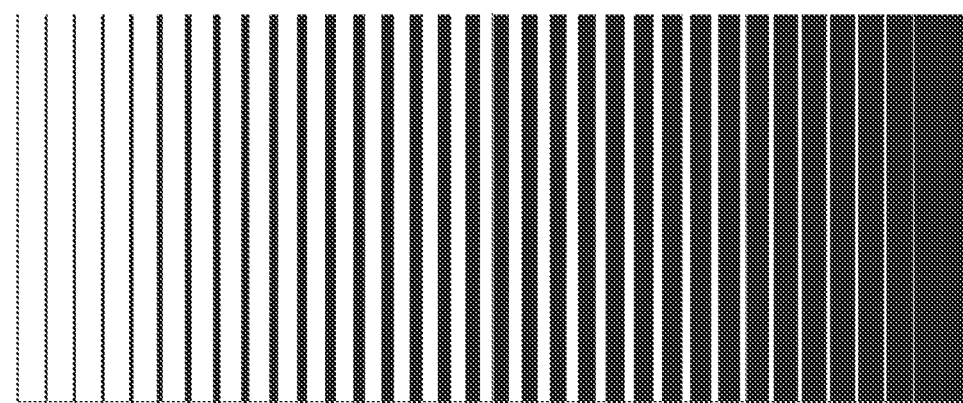
FIG. 13 shows a pattern that can be applied to a component.

In the following, the flow chart according to FIG. 12 will now be described, which shows a variation of the coating method according to the disclosure including the path correction method.

In a first step S1, the paint track 1 is first applied to the component.

In step S2, the paint track 1 is measured.

In a step S3, the measured values are transmitted to a robot controller or to a PC.

In step S4, the first paint track 1 is removed again.

The paint track 2 is applied in a step S5.

In step S6, the paint track 2 is measured.

In step S7, the measured values from the measurement of the paint track 2 are transmitted to a robot controller or a PC.

In step S8, the paint track 2 is removed again.

In step S9, the motion program is corrected according to the measured values.

In step S10, the actual coating operation takes place with a correspondingly corrected motion program.

Finally, FIG. 3 shows an example of a pattern that can be applied to a component, the pattern being sensitive to mis-positioning of the respective application device.

The disclosure is not limited to the preferred embodiments described above. Rather, the disclosure also encompasses variants and variations which also make use of the disclosed concept and therefore fall within the scope of protection.

The invention claimed is:

1. A path correction method that corrects paint tracks during the coating of a component with a coating agent, comprising:

defining a reference path, applying a first coating track of the coating agent to the component, the first coating track and the reference path running adjacent to one another, determining a path error at a seam between the first paint track and the adjacent reference path, determining path correction values for correcting the course of the first coating track in a subsequent coating operation, the path correction values being determined as a function of the path error, applying a subsequent first coating track of the coating agent in a subsequent coating operation using the determined path correction values which reduces the path error at a seam between the subsequent first coating track and the reference path, applying a second coating track of the coating agent to the component alongside the first coating track, wherein during the application of the first coating track and the second coating track a path gap is generated to distinguish the first coating track from the second coating track on the component, and a subsequent path error is measured when the first coating track and the second coating track are both applied to the component, wherein the path gap is produced by controlling an applicator which applies the coating agent by switching off individual nozzles of the applicator, determining subsequent path correction values as a function of the subsequent path error, and applying a subsequent coating track of the coating agent to the component, without generating a path gap between the subsequent coating track and an adjacent coating track, using the determined subsequent path correction values which reduces the path error at a seam between the subsequent coating track and the adjacent coating track.

2. The path correction method according to claim 1, wherein the reference path is predetermined independently of the coating by the shape of the component.

3. The path correction method according to claim 2, wherein the reference path is a component edge or a design edge.

4. The path correction method according to claim 1, wherein further path correction values are also determined for further adjacent coating tracks next to the first coating track and/or next to the second coating track, so that the path error does not migrate on to the further adjacent coating tracks.

5. The path correction method according to claim 1, wherein the first coating track is applied by a first coating robot which guides a first application device over the component, and the second coating track is applied by a second coating robot which guides a second application device over the component.

6. The path correction method according to claim 1, wherein the first coating track and the second coating track are both applied by the same coating robot, which guides an application device over the component to be coated, and the coating robot applies the two coating tracks differently.

7. The path correction method according to claim 6, wherein the coating robot applies the two coating with opposite directions of movement of the applicator device.

8. The path correction method according to claim 1, wherein determining the path error at the seam between the first paint track and the adjacent reference path is carried out by means of a stationary measurement system.

9. The path correction method according to claim 8, wherein the stationary measurement system is a light-section measurement system having at least one light source for projecting a light line onto the component and at least one camera for detecting the light line on the component.

10. The path correction method according to claim 1, wherein determining the path error at the seam between the first paint track and the adjacent reference path is carried out by a mobile measurement system which is attached to the respective coating robot.

11. The path correction method according to claim 1, wherein the first coating track is applied by a first coating robot that guides a first application device and a first mobile measurement system over the component, and the second coating track is applied by a second coating robot which guides a second application device and a second mobile measurement system over the component.

12. The path correction method according to claim 1, wherein the first coating track is applied by a first coating robot that guides a first application evice over the component but does not guide a mobile measurement system, and the second coating track is applied by a second coating robot which guides a second application device and a second mobile measurement system over the component.

* * * * *